US009911532B2

United States Patent
Gupta et al.

(10) Patent No.: US 9,911,532 B2
(45) Date of Patent: Mar. 6, 2018

(54) FORCED CONVECTION LIQUID COOLING OF FLUID-FILLED HIGH DENSITY PULSED POWER CAPACITOR WITH NATIVE FLUID

(71) Applicant: Raytheon Company, Waltham, MA (US)

(72) Inventors: Anurag Gupta, Canton, MA (US); Robert R. Lopez, Boxford, MA (US); Stephen B. Kuznetsov, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 327 days.

(21) Appl. No.: 14/467,299

(22) Filed: Aug. 25, 2014

(65) Prior Publication Data

US 2016/0055971 A1 Feb. 25, 2016

(51) Int. Cl.
| | |
|---|---|
| *H01G 2/14* | (2006.01) |
| *H01G 5/017* | (2006.01) |
| *H01G 4/002* | (2006.01) |
| *H01G 2/08* | (2006.01) |
| *H05K 7/20* | (2006.01) |

(Continued)

(52) U.S. Cl.
CPC ............. *H01G 2/08* (2013.01); *H01G 2/106* (2013.01); *H01G 4/38* (2013.01)

(58) Field of Classification Search
CPC ........... H01G 9/155; H01G 2/08; H01G 4/385
USPC ........... 361/502, 274.1–274.3, 689–690, 696
See application file for complete search history.

(56) References Cited

U.S. PATENT DOCUMENTS

| | | |
|---|---|---|
| 1,646,823 A | 10/1927 | Karapetoff |
| 2,149,082 A | 2/1939 | Buell et al. |
| 2,740,510 A | 4/1956 | Berthold |

(Continued)

FOREIGN PATENT DOCUMENTS

| | | |
|---|---|---|
| EP | 0033697 A2 | 8/1981 |
| EP | 0124809 A1 | 11/1984 |

(Continued)

OTHER PUBLICATIONS

Kuznetsov, S.; U.S. Patent Application entitled "Electro-Mechanical Kinetic Energy Storage Device and Method of Operation" U.S. Appl. No. 13/458,586, filed Apr. 27, 2012, 38 pgs.

(Continued)

*Primary Examiner* — Eric Thomas
*Assistant Examiner* — Arun Ramaswamy (57) ABSTRACT

A high density capacitor comprises a housing having a cavity, and a plurality of capacitors forming at least one capacitor bank disposed in the housing cavity. A native cooling fluid is disposed in the cavity, and a heat exchanger is coupled to the housing. A pump is configured to circulate the native cooling fluid from the cavity, through the heat exchanger, through the spacings along an outer surface of each of the capacitors to cool the capacitors using forced convection. The heat exchanger is configured to communicate a secondary fluid through the heat exchanger and draw heat from the native cooling fluid flowing through the heat exchanger. The heat exchanger may have a plenum having a plurality of openings configured to dispense the native cooling fluid from the heat exchanger proximate the at least one capacitor bank.

27 Claims, 12 Drawing Sheets

(51) Int. Cl.
*H01G 2/10* (2006.01)
*H01G 4/38* (2006.01)

(56) References Cited

U.S. PATENT DOCUMENTS

| | | | |
|---|---|---|---|
| 3,024,298 | A | 7/1958 | Goltsos et al. |
| 3,004,381 | A | 10/1961 | Schweitzer |
| 3,043,000 | A | 7/1962 | Hatfield |
| 3,183,431 | A | 5/1965 | Ford |
| 3,187,250 | A | 6/1965 | Born et al. |
| 3,315,148 | A | 4/1967 | Grillo |
| 3,452,229 | A | 6/1969 | Pimlott et al. |
| 3,571,693 | A | 3/1971 | Riaz |
| 3,667,012 | A | 5/1972 | Kilgore |
| 4,001,666 | A | 1/1977 | Grenfell |
| 4,011,535 | A | 3/1977 | Kosky et al. |
| 4,048,603 | A | 9/1977 | Staub |
| 4,393,964 | A | 7/1983 | Kemper |
| 4,439,720 | A | 3/1984 | Georges |
| 4,444,444 | A | 4/1984 | Benedetti et al. |
| 4,612,494 | A | 9/1986 | Kawamura |
| 4,623,771 | A | 11/1986 | Sakino |
| 4,926,107 | A | 5/1990 | Pinson |
| 4,947,287 | A | 8/1990 | Hoppe |
| 4,971,522 | A | 11/1990 | Butlin |
| 5,097,194 | A | 3/1992 | Walton et al. |
| 5,508,672 | A | 4/1996 | Sokai |
| 5,545,966 | A | 8/1996 | Ramos et al. |
| 5,646,458 | A | 7/1997 | Bowyer et al. |
| 5,660,749 | A | 8/1997 | Taguchi |
| 5,808,535 | A | 9/1998 | Delucia |
| 5,921,505 | A | 7/1999 | Spector |
| 6,023,152 | A | 2/2000 | Briest et al. |
| 6,078,119 | A | 6/2000 | Satoh et al. |
| 6,239,513 | B1 | 5/2001 | Dean |
| 6,384,703 | B1 | 5/2002 | Ramos et al. |
| 6,573,626 | B1 | 6/2003 | Gosebruch et al. |
| 6,710,579 | B2 | 3/2004 | Ebel et al. |
| 6,885,268 | B2 | 4/2005 | Choi |
| 7,002,443 | B2 | 2/2006 | Ness et al. |
| 7,142,085 | B2 | 11/2006 | Phadke |
| 7,489,226 | B1 | 2/2009 | Chignola et al. |
| 7,663,328 | B2 | 2/2010 | Gonder |
| 7,710,081 | B2 | 5/2010 | Saban |
| 8,009,004 | B2 | 8/2011 | Ahangar et al. |
| 8,373,970 | B2 | 2/2013 | Jakoubovitch |
| 9,306,386 | B2 | 4/2016 | Kuznetsov |
| 2003/0231094 | A1 | 12/2003 | Funk |
| 2005/0012395 | A1 | 1/2005 | Eckroad |
| 2007/0163765 | A1* | 7/2007 | Rondier ............... H01L 23/473 165/170 |
| 2008/0103632 | A1 | 5/2008 | Saban |
| 2009/0134705 | A1 | 5/2009 | Kalev |
| 2010/0134940 | A1* | 6/2010 | Nguyen ................ H01G 2/08 361/91.1 |
| 2011/0084568 | A1 | 4/2011 | Lateb et al. |
| 2012/0050992 | A1* | 3/2012 | Ra ...................... H01G 11/10 361/699 |
| 2012/0075047 | A1 | 3/2012 | Luckey et al. |
| 2012/0187922 | A1 | 7/2012 | Dubois |
| 2012/0286523 | A1 | 11/2012 | Hull et al. |
| 2013/0020893 | A1 | 1/2013 | Bradley et al. |
| 2013/0127391 | A1 | 5/2013 | Lewis |
| 2013/0257186 | A1 | 10/2013 | Kozar et al. |
| 2013/0260999 | A1 | 10/2013 | Hull et al. |
| 2013/0261001 | A1 | 10/2013 | Hull et al. |
| 2013/0285491 | A1 | 10/2013 | Kuznetsov |
| 2014/0132380 | A1 | 5/2014 | Jacobson et al. |
| 2014/0346868 | A1 | 11/2014 | Kuznetsov |
| 2015/0288271 | A1 | 10/2015 | Kuznetsov |

FOREIGN PATENT DOCUMENTS

| | | |
|---|---|---|
| EP | 0849170 A1 | 6/1998 |
| GB | 167916 A | 8/1921 |

OTHER PUBLICATIONS

Kuznetsov, S.; U.S. Patent Application entitled "Method and Apparatus for Control of Pulsed Power in Hybrid Energy Storage Module"; U.S. Appl. No. 14/591,695, filed Jan. 7, 2015; 47 pages.

Kuznetsov, S.; U.S. Patent Application entitled "System and Method for Parallel Configuration of Hybrid Energy Storage Module", U.S. Appl. No. 14/711,632, filed May 13, 2015, 55 pgs.

International Search Report and Written Opinion issued for PCT/US2016/012513, dated May 30, 2016, 11 pgs.

L.A. Kilgore et al., "Energy Storage At Site Permits Use of Large Excavators on Small Power Systems", Westinghouse Engineer, Nov. 1970, vol. 30 No. 6, pp. 162-167.

Limpaecher, et al. "Resonant Link PFN Charger and Modular Power Supply" Science Application International Corporation Electrical Power Technology Division, IEEE, 2007; pp. 1495-1499.

Narbut, et al.; "Vaporization Cooling for Power Transformers" Transaction of the AIEE; Power Apparatus & Systems, Part 111; Dec. 1959; 7 pages.

Moore, et al.; "Design and Performance Characteristics of GasNapor Transformers"; Trans. IEEE; Power Apparatus & Systems; vol. PAS-101; Jul. 1982; 4 pages.

Mike Strasik, "Flywheel Electricity Systems with Superconducting Bearings for Utility Applications," Boeing Phantom Works, Jul. 28, 2004, 32 pages.

International Search Report, dated Sep. 2, 2015, in connection with International Application No. PCT/US2015/017264, 5 pages.

Written Opinion of the International Searching Authority, dated Sep. 2, 2015, in connection with International Application No. PCT/US2015/017264, 7 pages.

3M Electronics, Product Information, "3M Novec 549 Engineered Fluid", < URL: http:/iso!utions.3mmagyar.hu/3MContentRetrievaiAP!/BlobServ!ei?Imd'"135•I 67810•1 OOO &locaie"hu_ HU&esset Type,,,MMM . . . Imege &assetid=13i9241050803&blobAttribute=ImageFile> Sep. 9, 2009, 4 pages.

Walls, WA, "Rotating machines for pulsed power", IEEE Xplore Abstract, Conference Record of the 25th Intemaiionai Symposium and 2002 High-voltage Workshop, .Jun. 30-Jul. 3, 2002, 8 pages, IEEE, New York, NY.

"Vaporization Cooling for Power Transformers," P. Narbut, et al. Transaction of the AIEE, Power Apparatus & Systems, Part III, Dec. 1959, pp. 1319-1325.

"Design and Performance Characteristics of GasNapor Transformers," Trans. IEEE, Power Apparatus & Systems, vol. PAS-101, Jul. 1982, pp. 2167-2170.

Notification of Transmittal of the International Search Report and the Written Opinion of the International Searching Authority, or the Declaration dated Mar. 21, 2014 in connection with International Patent Application No. PCT/US2013/063791.

J. Biela, et al., "Cooling Concepts for High Power Density Magnetic Devices", IEEJ Trans. IA, vol. 128, No. 4, 2008, p. 1-8.

* cited by examiner

FORCED CONVECTION LIQUID COOLING OF FLUID-FILLED HIGH DENSITY PULSED POWER CAPACITOR WITH NATIVE FLUID

TECHNICAL FIELD

The present disclosure is directed in general to a high density, fluid-filled, pulsed power capacitor, and more particularly to cooling the capacitor to reduce peak operational temperatures, reduce cool-down time, and maintain operating capacitance under high stress conditions; thereby extending operational time for use

BACKGROUND OF THE DISCLOSURE

High density pulsed power capacitors are useful in delivering high power electrical pulses with fast current rise times and short pulse duration. A series of pulses may be delivered to a load, which increases the capacitor temperature due to energy storage as each pulse is delivered. The rise in temperature is often additive as each pulse is delivered. Some applications, especially military ones, need pauses after every pulse and/or a series of pulses. A significant temperature restitution may be needed during these pauses to maintain optimal operation of the capacitor by preventing the degradation of the dielectric capability of the capacitor and also to enable the required mission. Thus, high temperatures and/or extended cool down periods are very undesirable. Some capacitors are comprised of a rolled winding having a polypropylene material forming the dielectric and that may be rated up to about 55 degrees Celsius, and have energy densities of between 2 J/cc and 3.5 J/cc. Certain constructions may include a bank of capacitors to allow 80,000 Amp output current for fast pulses in the 0.1 to 10 ms range for directed energy applications requiring a unit size of 50 kJ to 400 kJ/can. The down time of the capacitor during a cooling cycle may extend many hours due to the large time constant of the capacitor, creating an extended and undesired downtime.

Some capacitors may be liquid cooled. However, conventional liquid cooled capacitors have limited ability to remove sufficient heat or thermal energy from the capacitor, and extended downtimes of hours are still incurred along with unacceptably high dielectric temperatures in high-stress operational conditions.

SUMMARY OF THE DISCLOSURE

To address one or more of the above-deficiencies of the prior art, one embodiment described in this disclosure provides forced convection liquid cooling of a fluid-filled high density pulsed power capacitor with native fluid.

In a first example embodiment of the disclosure, a high density capacitor comprises of a housing having a cavity, and a plurality of capacitors forming at least one capacitor bank disposed in the housing cavity. The capacitors each have an outer surface, and spacers to introduce spacings between the capacitor outer surfaces. A native dielectric fluid is disposed in the cavity, and utilized as a cooling fluid via heat exchanger integrated to the housing. A pump is hydraulically coupled to the heat exchanger and is configured to circulate the native dielectric fluid residing in the cavity, through the heat exchanger, through the capacitor spacings and along the outer surface of each of the capacitors to cool the capacitors using forced convection. The pump may be physically coupled to the housing. The heat exchanger may have a plenum having a plurality of openings configured to dispense the native cooling fluid from the heat exchanger in proximity to at least one capacitor bank. The heat exchanger may have a first passageway configured to communicate the native cooling fluid from the pump to the plenum openings, a second passageway configured to communicate a secondary fluid, and a thermally conductive member separating the first passageway from the second passageway. In some embodiments, the heat exchanger is configured to communicate the secondary fluid through the heat exchanger and draw heat from the native cooling fluid flowing through the heat exchanger. In some embodiments, the first passageway and the second passageway are separated from each other by a planar member, wherein the first passageway is planar and the second passageway is planar. Both the first passageway and the second passageway may be formed by a pair of plates, each plate having a plurality of fins configured to create even planar flow of fluid through the respective said passageway. Each of the plates may be brazed to each other to create a brazement. The plenum openings may be configured to evenly dispense the native cooling fluid across the at least one capacitor bank, having an opening size graduated from one side of the plenum to another side of the plenum.

In some embodiments, the capacitor comprises of a bank of capacitors, and spacers introduced in between the capacitors. The spacer configuration may allow fluidic channel creation between the capacitors by maintaining physical separation of the capacitors. The spacer construction may have features to allow the absorption of thermal expansion of capacitors and mechanical stresses that are induced due to temperature variations during operation. These spacers may also allow the maintenance of a desired flow orientation of the native fluid in between the spacers. The spacers may also enable a uniform pressure distribution between the capacitors under electrical and mechanical loading.

In some embodiments, the capacitor comprises a first bank of capacitors, and a second bank of capacitors disposed upon the first bank of capacitors, and a spacer disposed between the first bank of capacitors and a second bank of capacitors. The spacer configuration may allow maintenance of a primary flow direction, for example, vertical. The spacer may be configured to also direct a portion of the native cooling fluid from the heat exchanger laterally between the first bank of capacitors and the second bank of capacitors. The spacer may have an interface surface configured to engage a top portion of the first bank of capacitors and a lower portion of the second bank of capacitors. The interface surface is configured to secure the first bank of capacitors with respect to the second bank of capacitors, and dampen any vibration of the first and second banks of capacitors. The spacer may have at least one opening configured to pass a portion of the native cooling fluid from the plenum openings in a primary direction, and a deflector configured to route a portion of the native cooling fluid from the plenum openings laterally between the first bank of capacitors and the second bank of capacitors. The spacer may be configured to provide turbulent flow of the native cooling fluid between the first bank of capacitors and the second bank of capacitors.

In some embodiments, the capacitors are elongated and have major surfaces extending normal with respect to the heat exchanger, configured such that a portion of the native cooling fluid flows in a column in the spacings between the major surfaces of the capacitors.

In another embodiment of this disclosure, a high density capacitor comprises a housing having a cavity, a plurality of capacitors forming a capacitor bank disposed in the housing cavity, the capacitors each having an outer surface, the capacitor bank having spacings between the capacitor outer surfaces, and a native dielectric fluid disposed in the cavity. A heat exchanger is integrated with the housing and has a first passageway configured to communicate the native cooling fluid, a second passageway configured to communicate a secondary fluid, and a thermally conductive member separating the first passageway from the second passageway. A pump is configured to circulate the native cooling fluid from the cavity, through the heat exchanger first passageway, through the spacings and along the outer surface of each of the capacitors to cool the capacitors using forced convection. The second passageway is configured such that the secondary fluid flowing through the second passageway is configured to draw heat from the native cooling fluid flowing through the first passageway. In some embodiments, the heat exchanger has a plenum having a plurality of openings configured to dispense the native cooling fluid from the heat exchanger first passageway proximate the capacitor bank.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
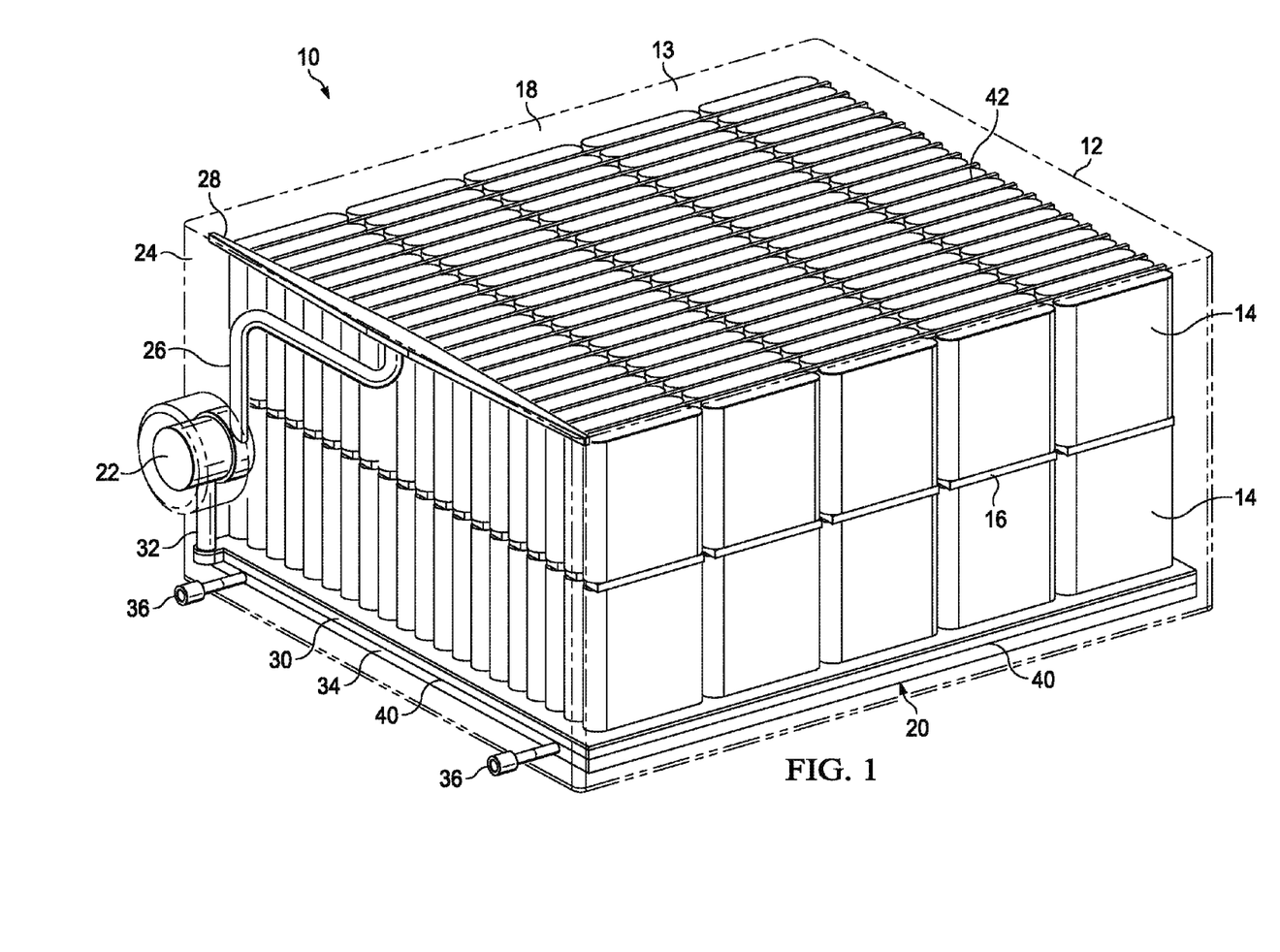
FIG. 1 illustrates an isometric view of a fluid-filled high density pulsed power capacitor with native fluid having forced convection liquid cooling features.

Referring to FIG. 1, there is shown at 10 an isometric view of a high density pulsed power capacitor with native fluid providing forced convection liquid cooling. The capacitor 10 is seen to comprise a hermetically sealed housing 12 having a cavity 13 enclosing two banks of capacitors 14, each capacitor 14 formed as coiled capacitor winding. The capacitors 14 are shown as having a generally planar form factor, vertically oriented with respect to the base, but they may have a cylindrical form factor or other configuration as desired. Each capacitor 14 has a dielectric, such as comprised of polypropylene. By way of illustration but without limitation to, each capacitor 14 may have a thickness of about 5.3 micrometers and a length of about 320 meters per roll. Other types of dielectrics and different dimensions of the capacitors 14 are within the scope of this disclosure. The banks of capacitors 14 may be configured in layers, with a non-metallic spacer plate 16 laterally extending between each layer as shown. The housing cavity 13 is filled with a native cooling fluid 18 configured to be both circulated about the exterior surfaces of each of the capacitors 14 to remove heat or thermal energy therefrom, and also release this heat or thermal energy via a heat exchanger 20 that is coupled to and forms a portion of the base of housing 12 as will be discussed below. The native cooling fluid 18 may be comprised, but is not limited to, vegetable oil, ester-based oils, or NOVEC fluids manufactured and trademarked by 3M CORPORATION of St. Paul, Minn.

Figure 2:
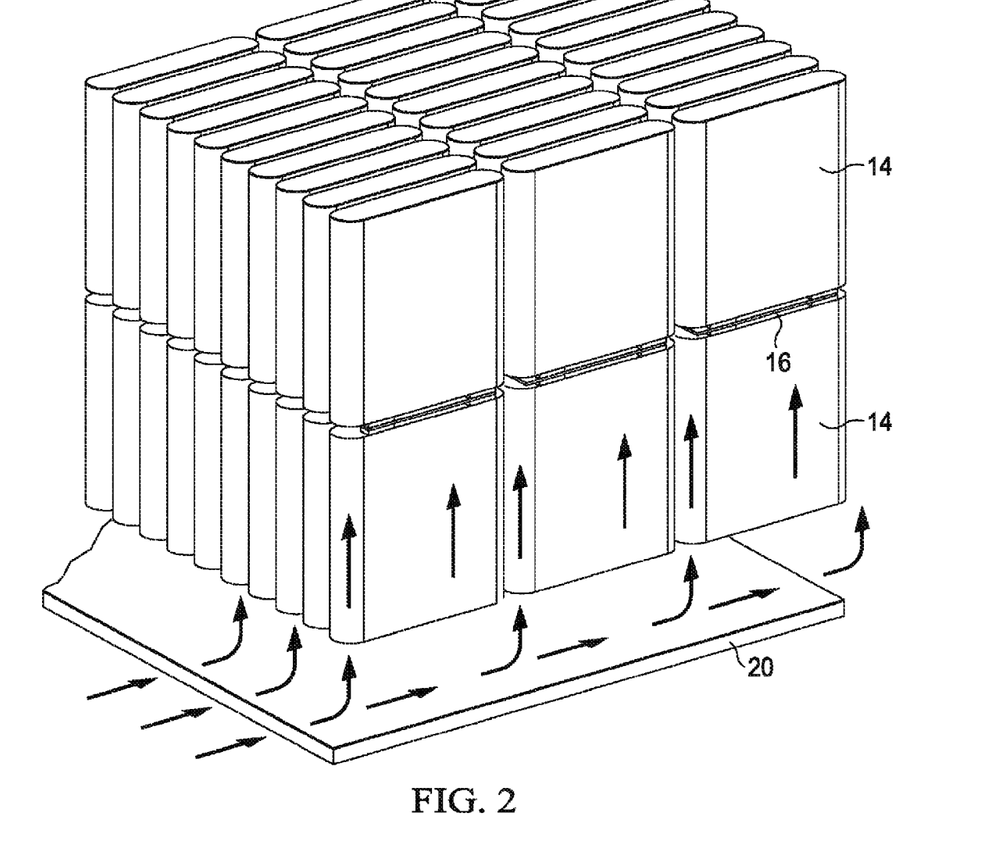
FIG. 2 illustrates the native cooling fluid flowing from the heat exchanger upwardly between the capacitors in a columnar flow pattern.
Figure 3:
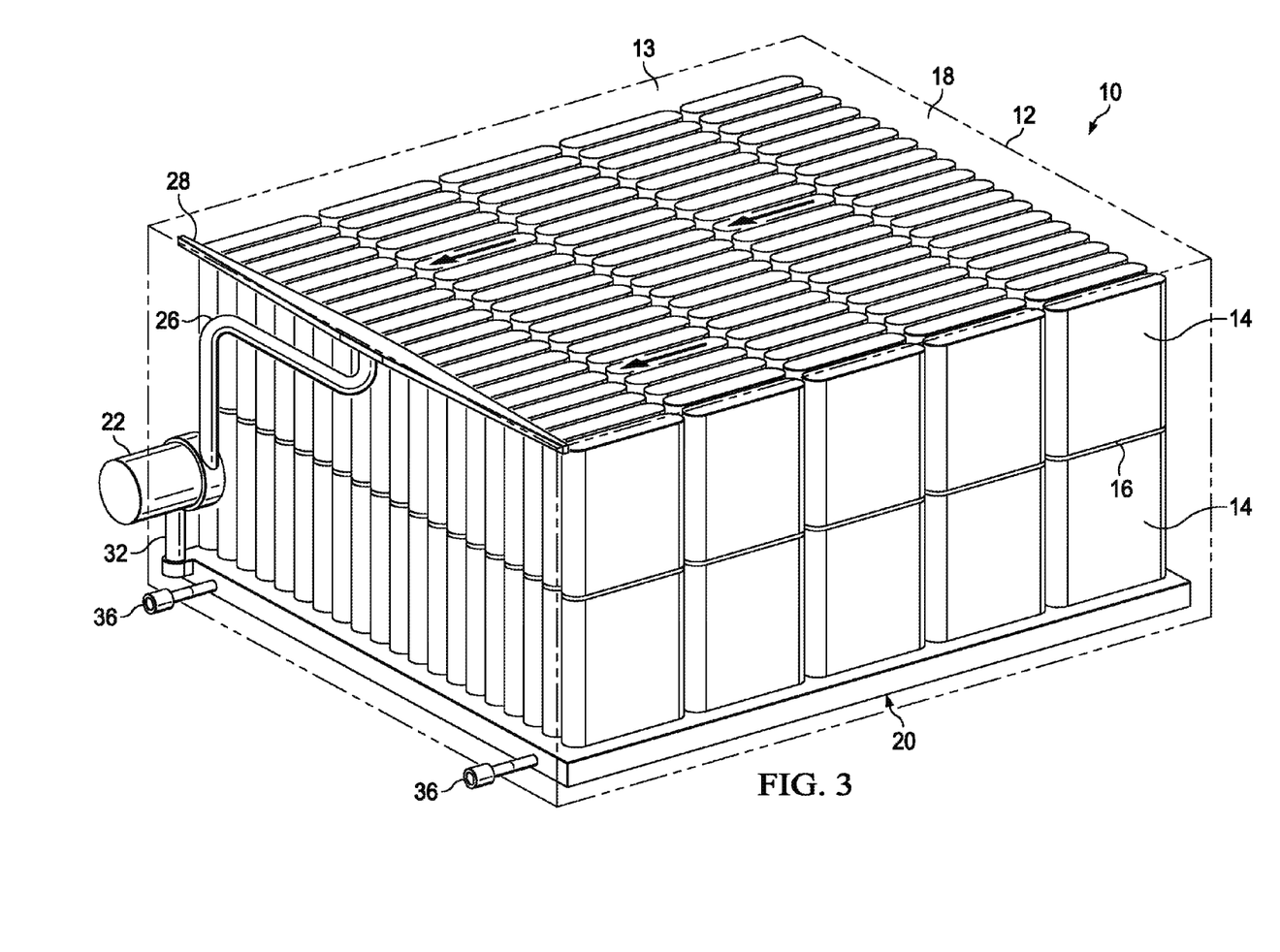
FIG. 3 illustrates the native cooling fluid flow drawn back to the pump after circulating past the capacitors.

The capacitor 10 is seen to include a low profile submersible pump 22 secured to and sealed through an end wall 24 of housing 12. The pump 22 is configured to draw the native cooling fluid 18 in housing cavity 13 via an input passageway 26 and associated opening in a manifold 28 to a top portion of the cavity 13 above the banks of capacitors 14. The pump 22 is configured to circulate and deliver the native cooling fluid 18 to a planar upper portion 30 of the heat exchanger 20 via an output passageway 32, forcing the native cooling fluid 18 to circulate into cavity 13 and between and about each capacitor 14 to create forced convection cooling, as graphically shown by the arrows in FIG. 2. The heated native cooling fluid returns to the manifold 28 and pump 22 as shown in FIG. 3.

The heat exchanger 20 also comprises a planar lower portion 34 having input/output ports 36 configured to inject/remove a secondary cooling fluid 38 therein. The upper portion 30 and lower portion 34 of heat exchanger 20 are physically isolated from each other, but share a common thermally conductive plate 40 disposed therebetween to facilitate heat or thermal energy exchange between the native cooling fluid 18 and the secondary cooling fluid 38 (FIG. 5) as will be described below. The secondary cooling fluid 38 has a lower temperature than the heated native cooling fluid 18 and thus draws heat or thermal energy therefrom. Each of the capacitors 14 are spaced from one another by spacer strips 42 as will be discussed shortly.

Figure 4:
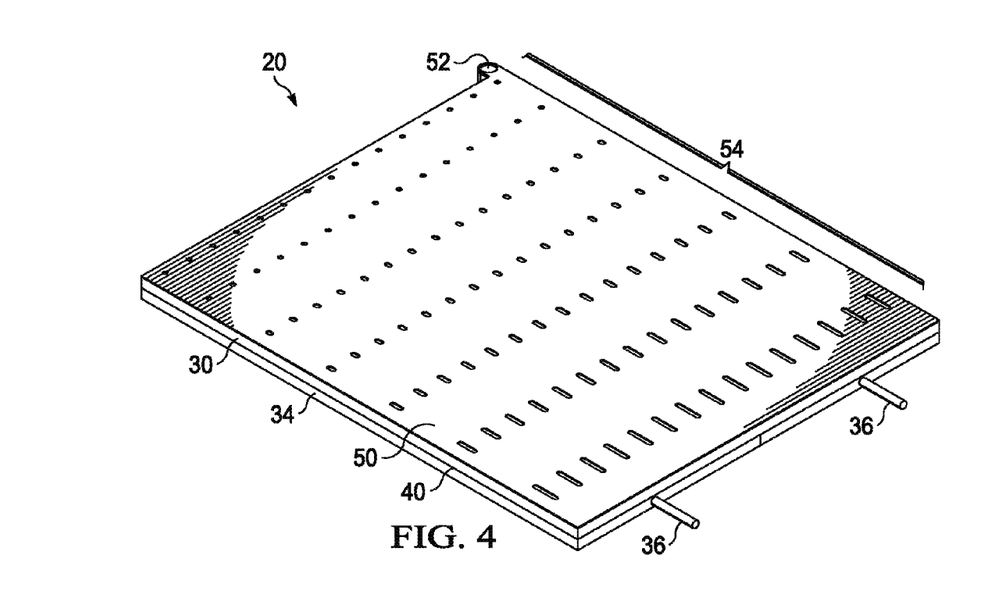
FIG. 4 illustrates the low profile heat exchanger with the graduated fluid openings providing uniform columnar flow.

FIG. 4 illustrates a top perspective view of the heat exchanger 20, showing the upper portion 30 having a diffuser plate 50. The heat exchanger 20 comprises an integrated native fluid discharge plenum, including the diffuser plate 50 and having a fluid inlet 52 configured to receive the native cooling fluid 18 from the output passageway 32. The diffuser plate 50 has a plurality of outlet openings 54 with graduated opening sizes configured to discharge the native cooling fluid 18 from the upper portion 30. The native cooling fluid 18 is slightly pressurized, and the graduated outlet openings 54 have varying slot geometry, and in combination with the plenum shape provide application specific fluid flow uniformity to the bottom of the bank of capacitors 14. The heat exchanger 20 has an extremely planar and compact design. By way of example, the upper portion 30 may have a height of 0.75 inches and the lower portion 34 may have a height of 0.5 inches, where the heat exchanger 20 has a length of 30 inches and a width of 18 inches.

Figure 5:
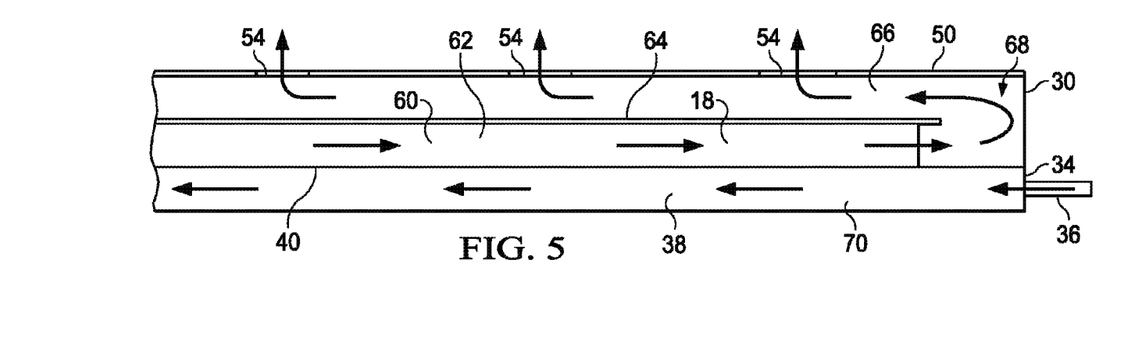
FIG. 5 illustrates a cross sectional view of a heat exchanger having the native cooling fluid flowing from the heat exchanger primary fluid inlet in a planar cavity to the fluid openings, and the secondary cooling fluid flowing in a planar cavity thereunder to thermally exchange heat.

FIG. 5 illustrates a cross sectional view of the flow of the native cooling fluid 18 flowing from the primary fluid inlet 52 (FIG. 4) in a planar passageway 60 having longitudinally extending fins 82 (FIG. 6) formed between a thermally conductive cover plate 64 and the lower portion 34. The flow of the native cooling fluid 18 wraps above to an upper planar cavity 66 forming part of the passageway 60 at portion 68. The cavity 66 is formed between the cover plate 64 and the diffuser plate 50, and the native fluid flow is discharged through the graduated outlet openings 54. A lower second passageway 70 in the heat exchanger 20 admits the secondary cooling fluid 38 flowing through ports 36 and below the first passageway 60; and the secondary cooling fluid 38 is configured to exchange heat with the native cooling fluid 18 flowing through passageway 60. The secondary cooling fluid 38 has a lower temperature than the native cooling fluid 18 flowing through passageway 60, and thus the secondary cooling fluid 38 draws heat from the native cooling fluid 18 to cool the native cooling fluid 18 to help remove heat or thermal energy transferred by the capacitors 14 into the native cooling fluid 18.

Figure 6:
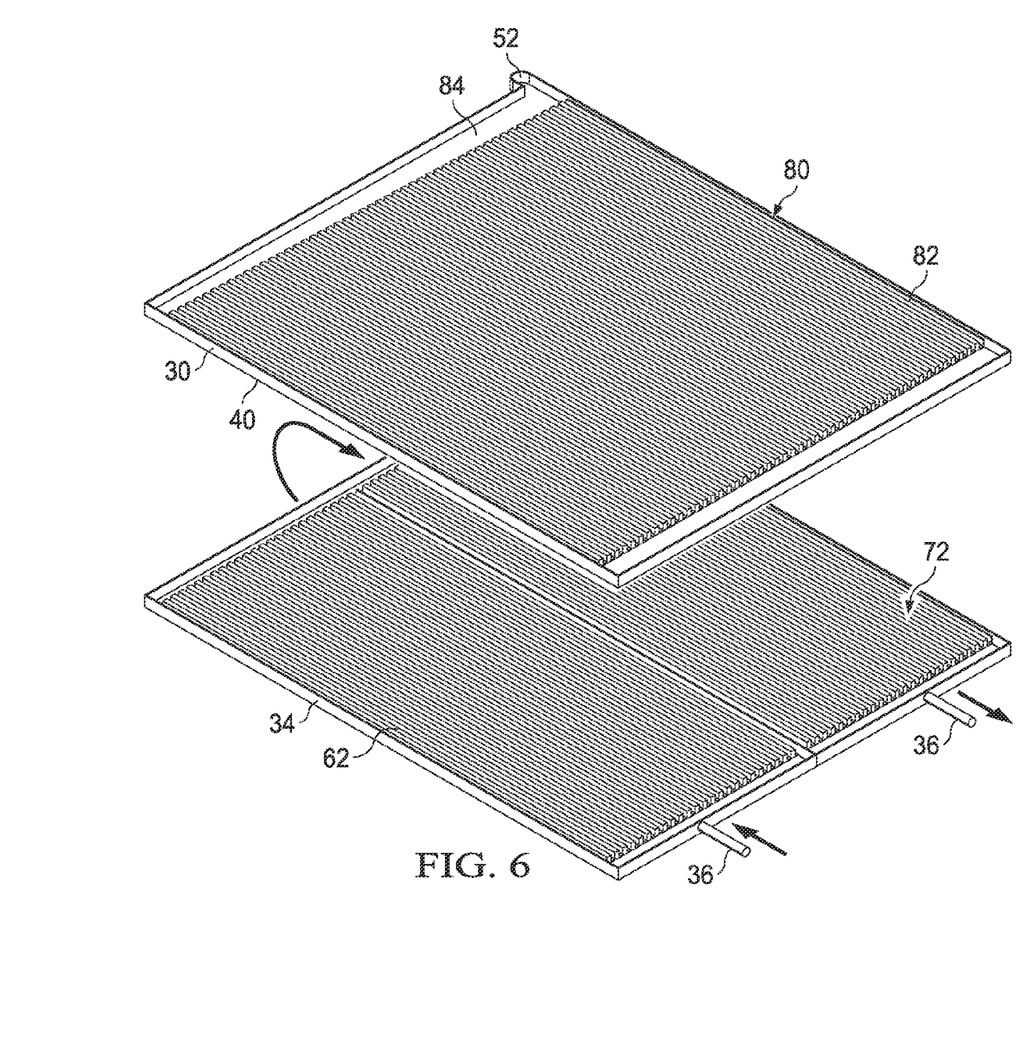
FIG. 6 illustrates the native cooling fluid fin section and the secondary cooling fluid fin section.
Figure 7:
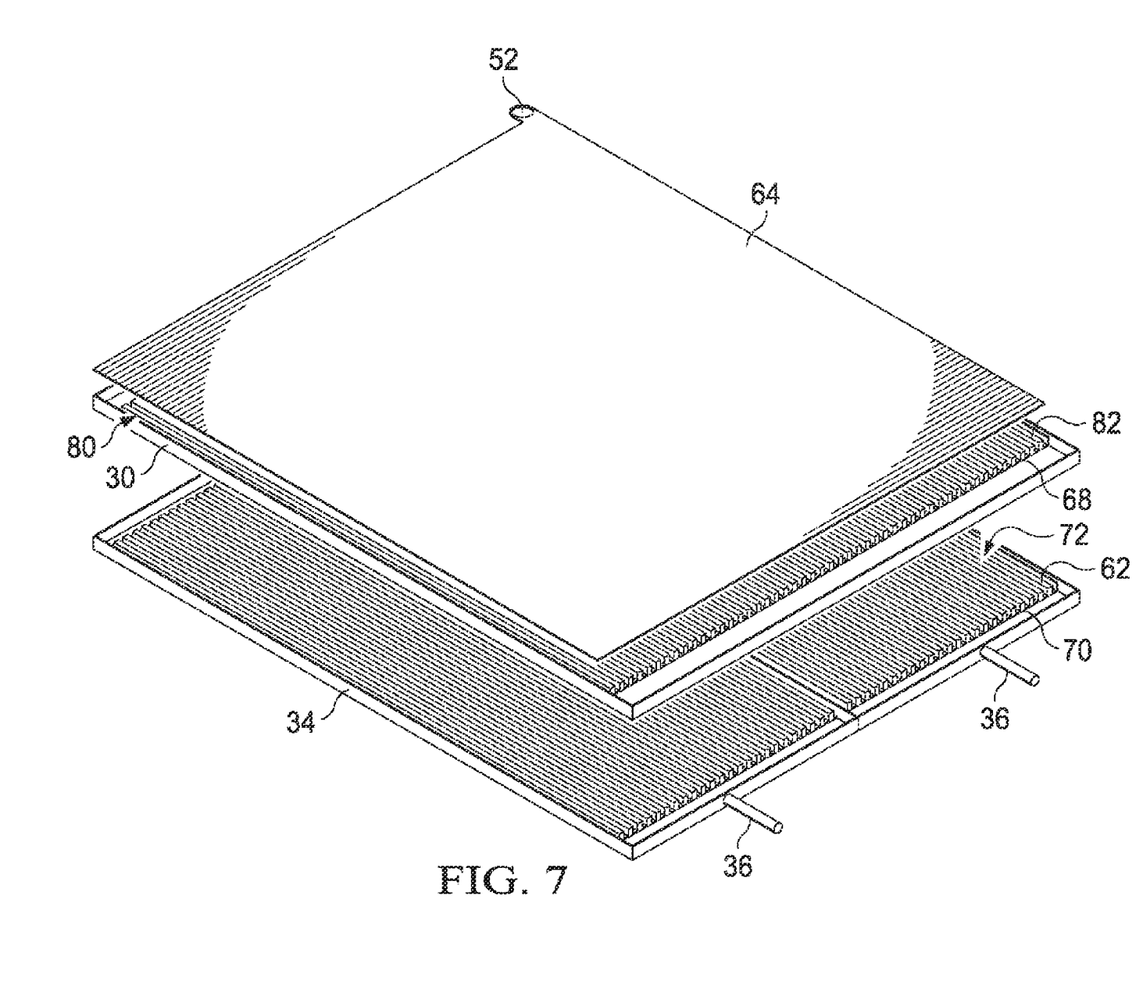
FIG. 7 illustrates the cover plate brazed to the top of the native cooling fluid fin section.
Figure 8:
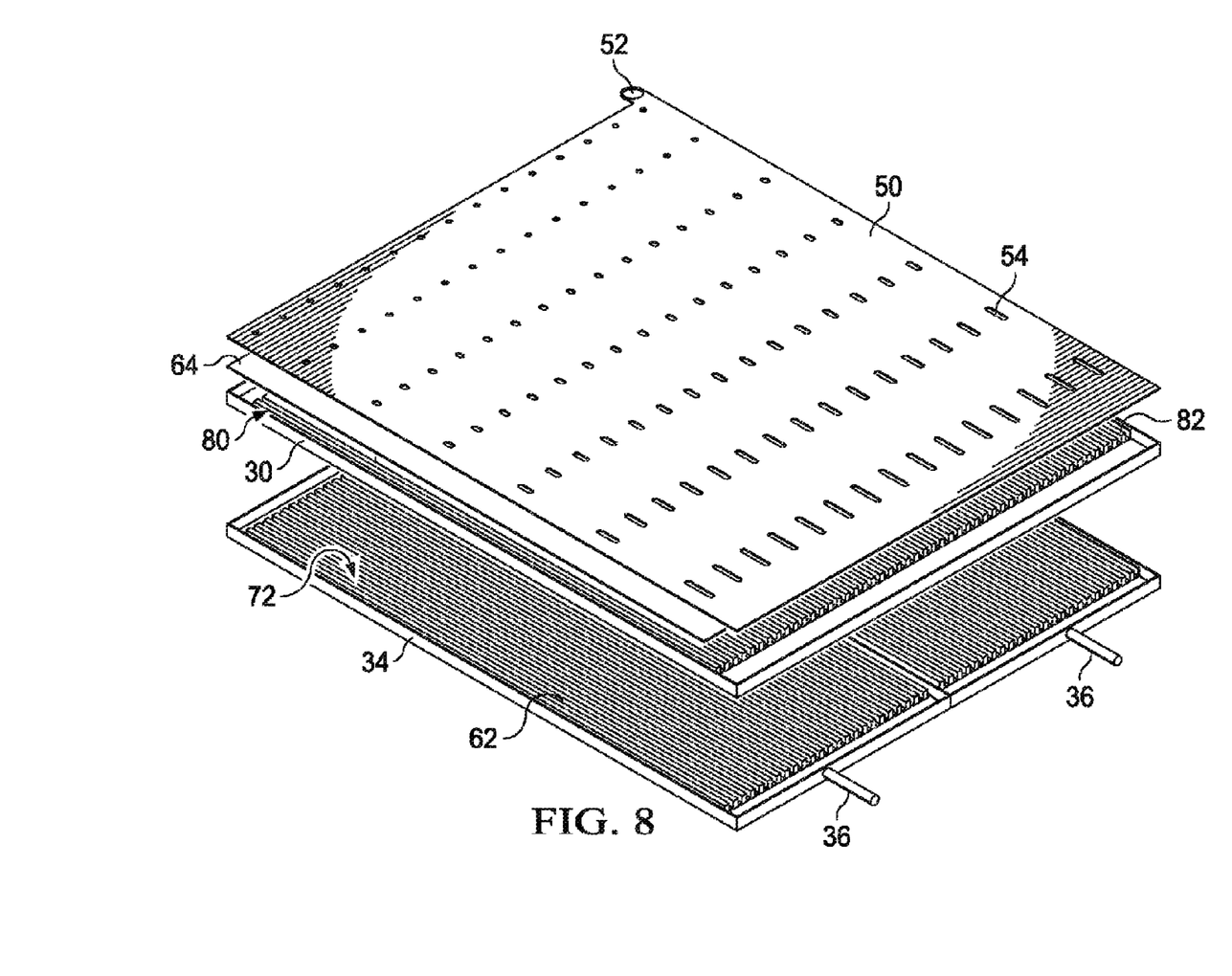
FIG. 8 illustrates the diffuser plate brazed to the top of the heat exchanger that forms a pressurized plenum.

Referring to FIG. 6, FIG. 7 and FIG. 8, there is shown an exploded view of the heat exchanger 20. FIG. 6 and FIG. 7 show the lower portion 34 comprised of a planar coolant fin section 72 having the longitudinally extending fins 62 spaced from one another to create fluid flow channels therebetween in passageway 70, as shown in FIG. 5. The fins 62 are configured to provide planar flow of the secondary cooling fluid 38 in passageway 70 and to increase the rate of heat or thermal energy exchange to the secondary cooling fluid 38 in fin section 72. The ports 36 inject and remove the secondary cooling fluid 38 into and from the lower portion 34. One port 36 injects the secondary cooling fluid 38, while the secondary cooling fluid is drawn out of the other port 36 in a constantly running loop. The upper portion 30 comprises a planar coolant fin section 80 brazed to the cover plate 64, marked in FIG. 7, to form a brazement. The fin section 80 has longitudinally extending fins 82 spaced from one another to create planar fluid flow channels in passageway 60. The fin section 80 is brazed to a top portion of the fin section 72 at the bottom to maximize heat transfer between the secondary cooling fluid 38 and the native cooling fluid 18, and hydraulically isolate the cooling fluids from each other. The fin section 80 is seen to have a tapered fluid injection opening 84 communicating the native cooling fluid 18 from the primary fluid inlet 52 to the channels defined between the fins 82.

FIG. 7 illustrates the cover plate 64 brazed to the top of the fin section 80 to form part of the brazement. The cover plate 64 does not cover the region 68 defined where the native cooling fluid 18 wraps around the edge of the cover plate 64 to cavity 66, as previously discussed and shown in FIG. 5.

FIG. 8 illustrates the diffuser plate 50 brazed to the upper portion of upper portion 30 above the cover plate 64 to form the discharge plenum comprising planar cavity 66 and openings 54, as also shown in FIG. 5. The diffuser plate 50 forms part of the brazement.

Figure 9:
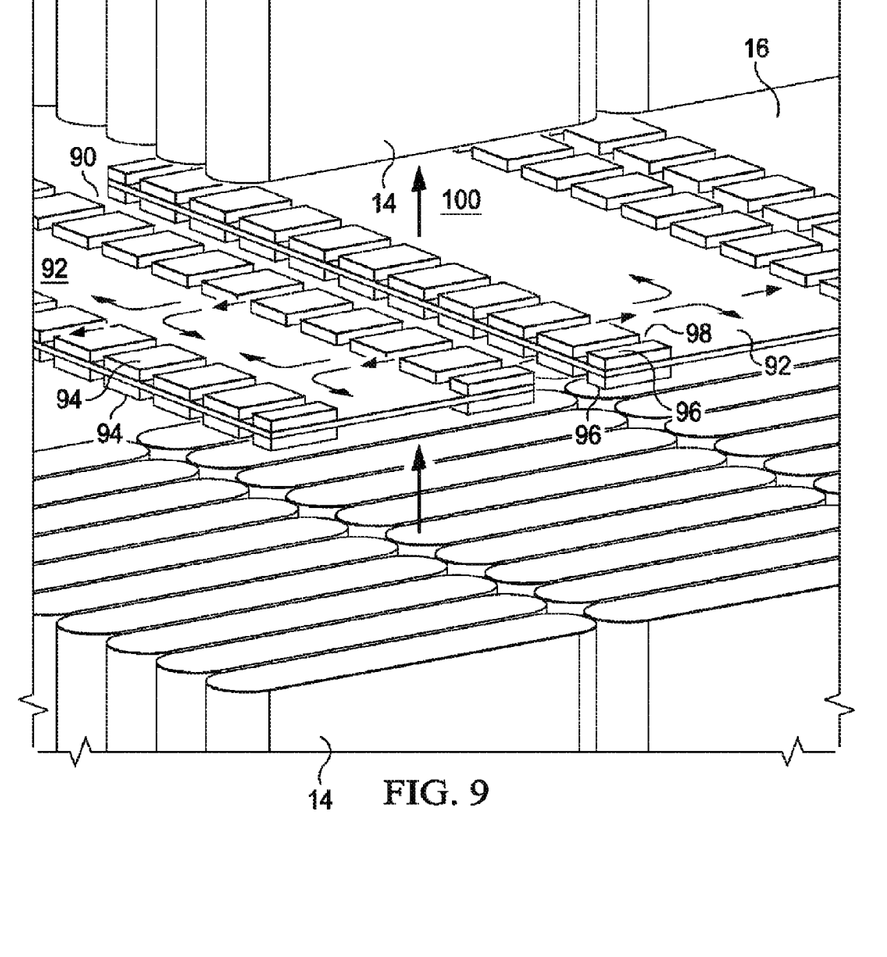
FIG. 9 illustrates the spacer plate including the flow directors between banks of capacitors.

FIG. 9 illustrates an exploded view of the spacer plate 16 comprising an interface interposed between the upper bank and the lower bank of capacitors 14. Spacer plate 16 is configured to vertically and laterally direct flow of the native cooling fluid 18, and also provides simultaneous shock and vibration isolation between the banks of capacitors 14. The spacer plate 16 includes strategic features including cutouts 90 to help maintain primary flow orientation of the native cooling fluid 18 from top to bottom in columns. The flow directors 92 are configured in an orientation enabling lateral fluid flow between the banks of capacitors with 3D flow mixing and increased turbulence to enhance thermal transport of the heat drawn from each of the capacitors 14 by convection. The flow directors 92 also serve the purpose of separating the ends of the opposing ends of capacitors 14, and also provide vibration isolation. Each flow director 92 of the spacer plate 16 is seen to include a plurality of linearly arranged spacers 94 secured to the upper surface and the lower surface of the respective flow director 92. The lower spacers 94 have lower surfaces 96 configured to engage the upper ends of the lower bank of capacitors 14, and the upper spacers 94 have upper surfaces 96 configured to engage the lower ends of the upper bank of capacitors 14. There is a spacer 94 for each capacitor 14, and each spacer 94 may be comprised of a resilient or slightly resilient material. The spacers 94 have fluid channels 98 defined therebetween, permitting lateral flow of a portion of the native cooling fluid 18 across planar portion 100 of the flow director 92 underneath and above the ends of capacitors 14 to cool the end portions of the capacitors 14.

Figure 10:
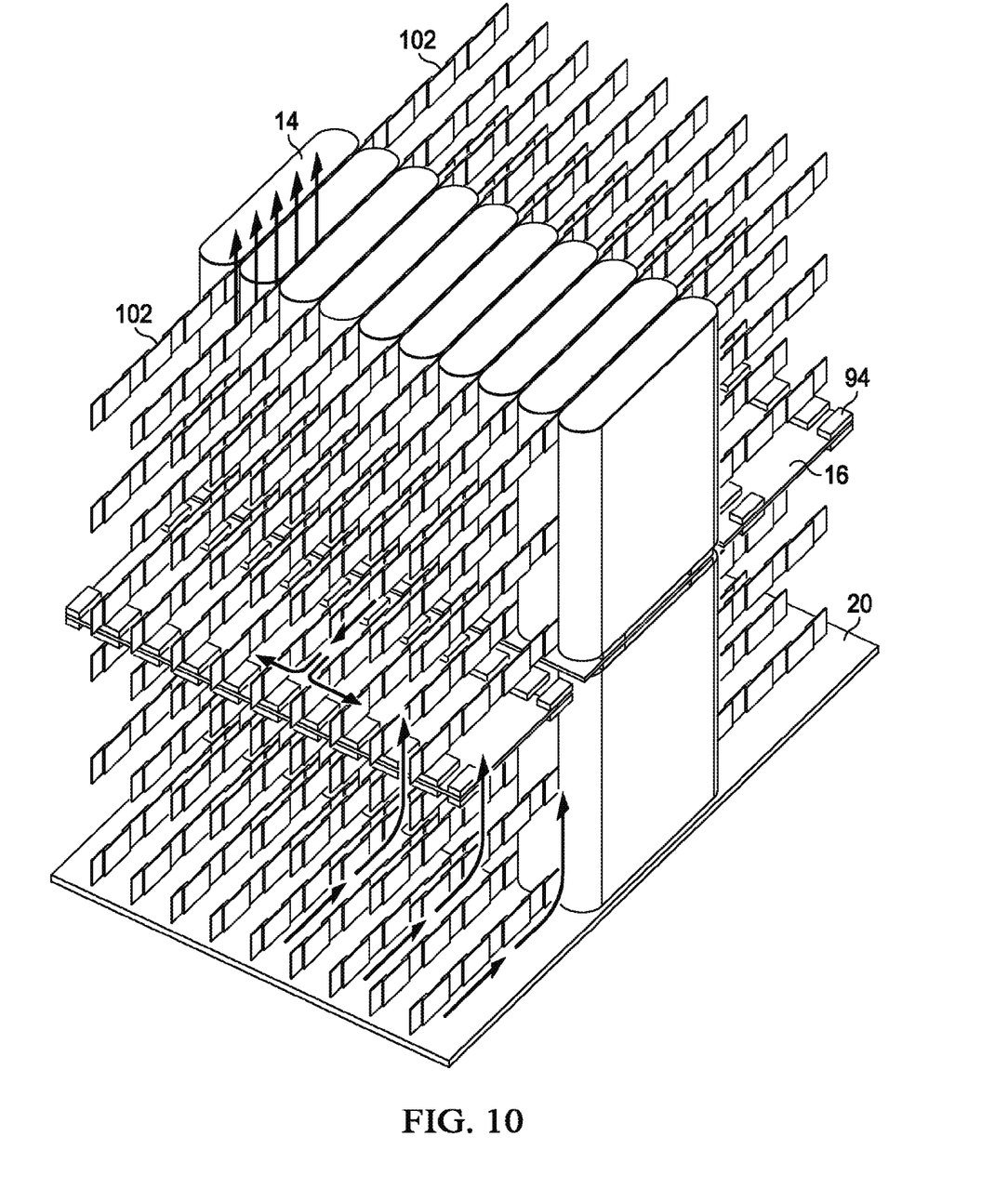
FIG. 10 illustrates the spacer members extending between the capacitors.

FIG. 10 illustrates a plurality of non-metallic integrated spacer strips 102 extending laterally between each of the capacitors 14, one spacer strip 102 extending along the top portion of a given bank of capacitors 14, one spacer strip 102 extending along the middle of the same bank of capacitors 14, and one spacer strip 102 extending along the lower portion of the bank of capacitors 14. There are three sets of spacer strips 102 for each bank of capacitors 14, as shown. The construction of the spacer strips 102 enables columnar fluid routing channels when placed against the major lateral surfaces of the capacitors 14. Cooler fluid forced through the heat exchanger 20 is admitted into the routing channels provided by the spacer strips 102 and against the lateral surfaces of capacitors 14 to provide cooling. Cutouts 90 in spacer plate 16 ensure the distribution of the cooling fluid to multiple banks of the spacer strips 102, as may be necessitated by multiple banks of capacitors. The integrated spacer strips 102 are spring-like secondary spacers that help create spacings between the major side surfaces of the capacitors 14, allowing the lateral major surfaces of the capacitors to be cooled while helping maintain a compressive preload between the capacitors 14 over a range of temperature operation, absorbing temperature-induced stresses and deformations. This cooling design is scalable and can be easily tailored to a variety of winding configurations and capacitor form factors.

Figure 11A:
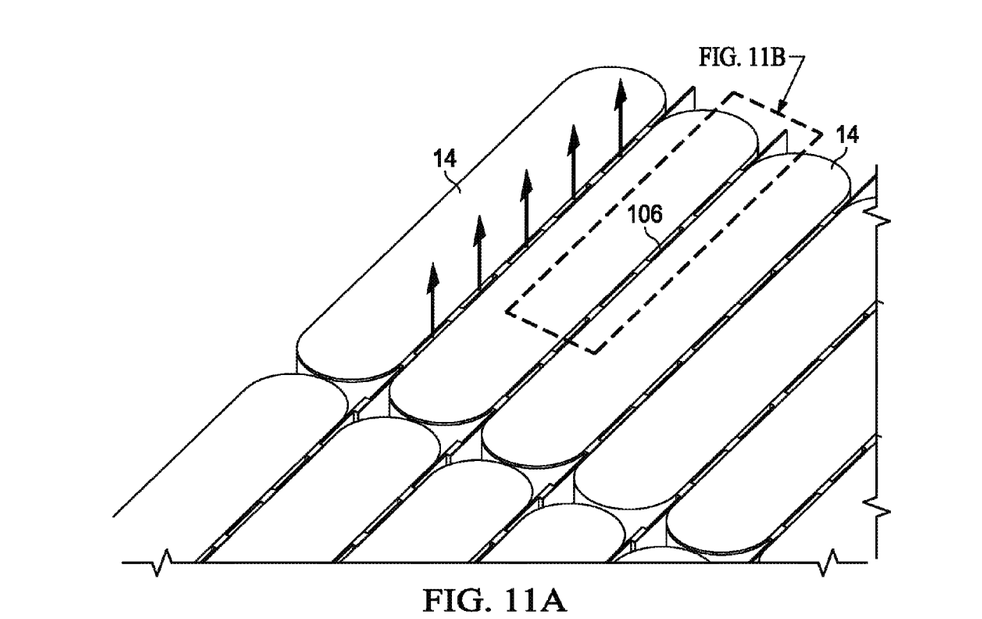
FIG. 11A and FIG. 11B illustrate a close-up view of the spacer members disposed between the capacitors.
Figure 11B:
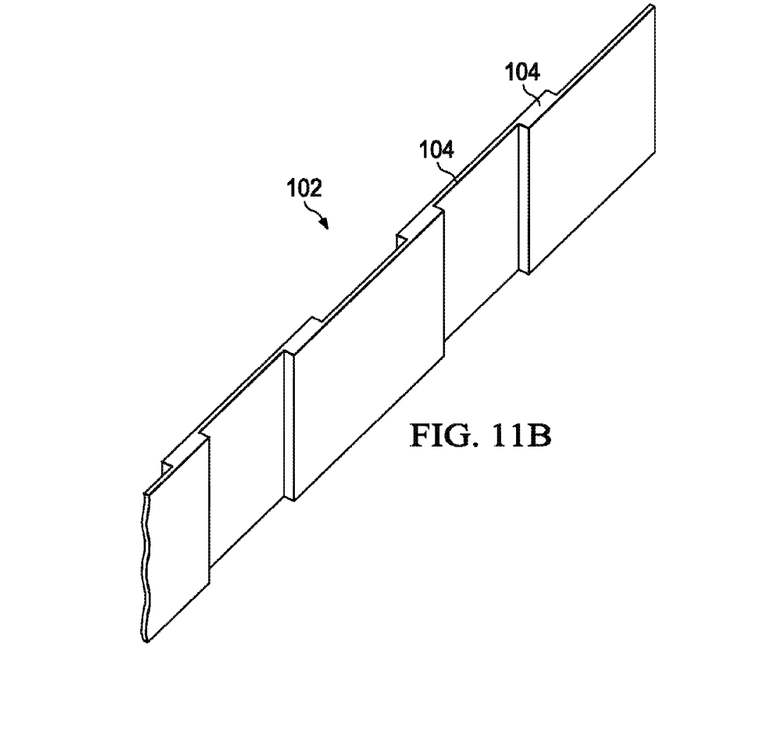

FIG. 11A illustrates the spacer strips 102 interposed between the capacitors 14. FIG. 11B illustrates each spacer strip 102 has overlapping solid trapezoidal sections 104 creating fluid routing channels 106 on each side of the spacer strips 102 when placed against the lateral surfaces of capacitors 14 to facilitate the vertical flow of the native cooling fluid 18. The overlapping sections 104 and the gaps created by them provide the spring-like compressive preload between the capacitors 14.

Figure 12:
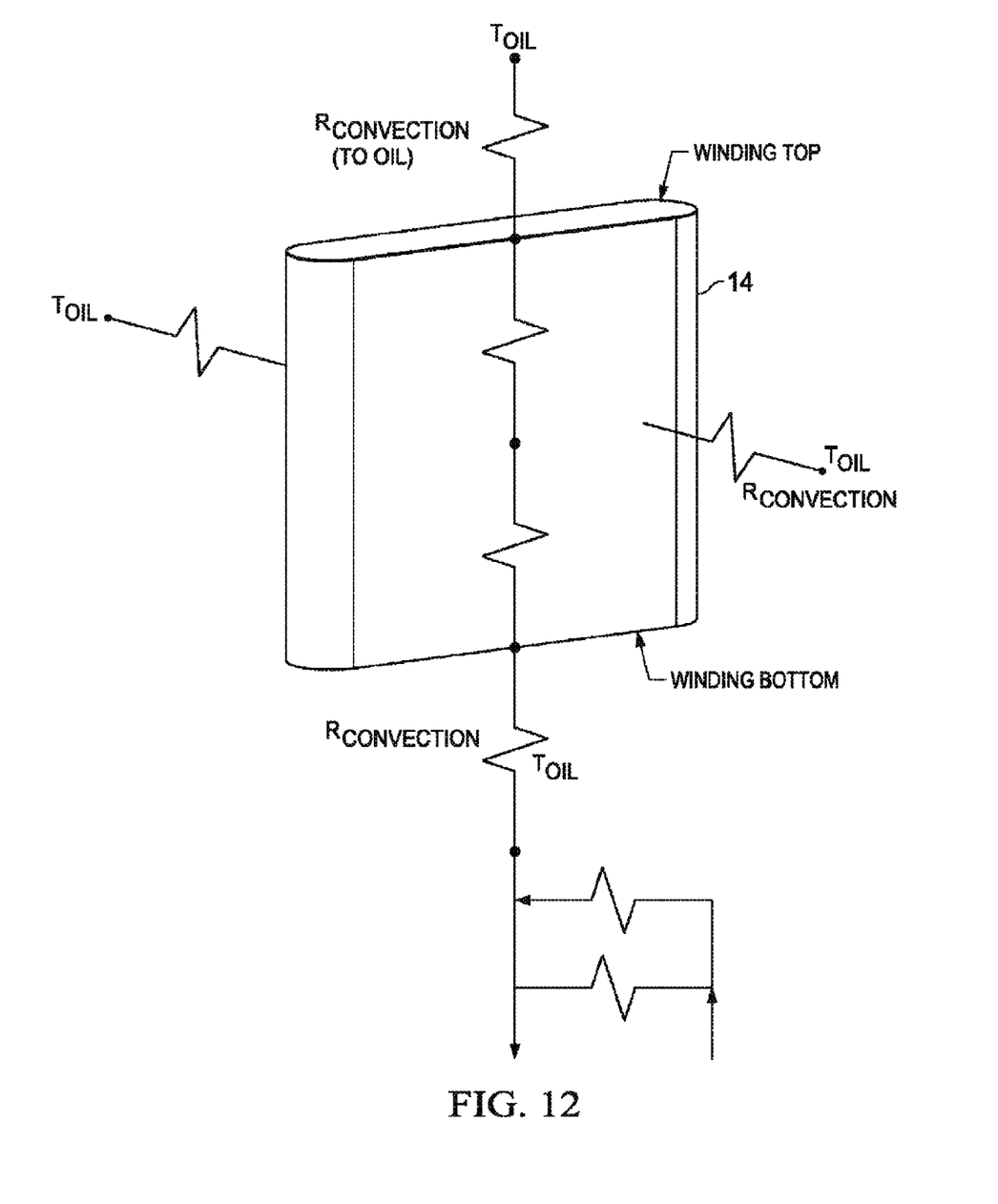
FIG. 12 illustrates the theoretical means of thermal enhancements using forced convection.

FIG. 12 graphically illustrates the mechanisms of thermal enhancements according to this disclosure. The utilization of active liquid-to-coolant heat exchanger 20 with pump flow limits native fluid temperature rise or its stagnation. The lateral surface areas of the capacitors 14, the largest areas for heat transfer, are transformed from dead zones to being active. The spring-like spacer strips 102 help utilize the lateral surface area efficiency with forced flow. The flow director 92 configuration further enhances heat transfer by introducing lateral flow to cool the top surface of the bottom capacitor bank and bottom surface of the top capacitor bank. Similar purpose is served by the fluid sweep enabled by manifold 28 at the top of the top capacitor bank. The top and the bottom surface areas of the capacitors 14 are thus better utilized, where the forced flow of native cooling fluid 18 provides an improved heat transfer coefficient. The flow directors 92 of the spacer plate 16, the spacer strips 102 and other features further enhance heat transfer.

Figure 13:
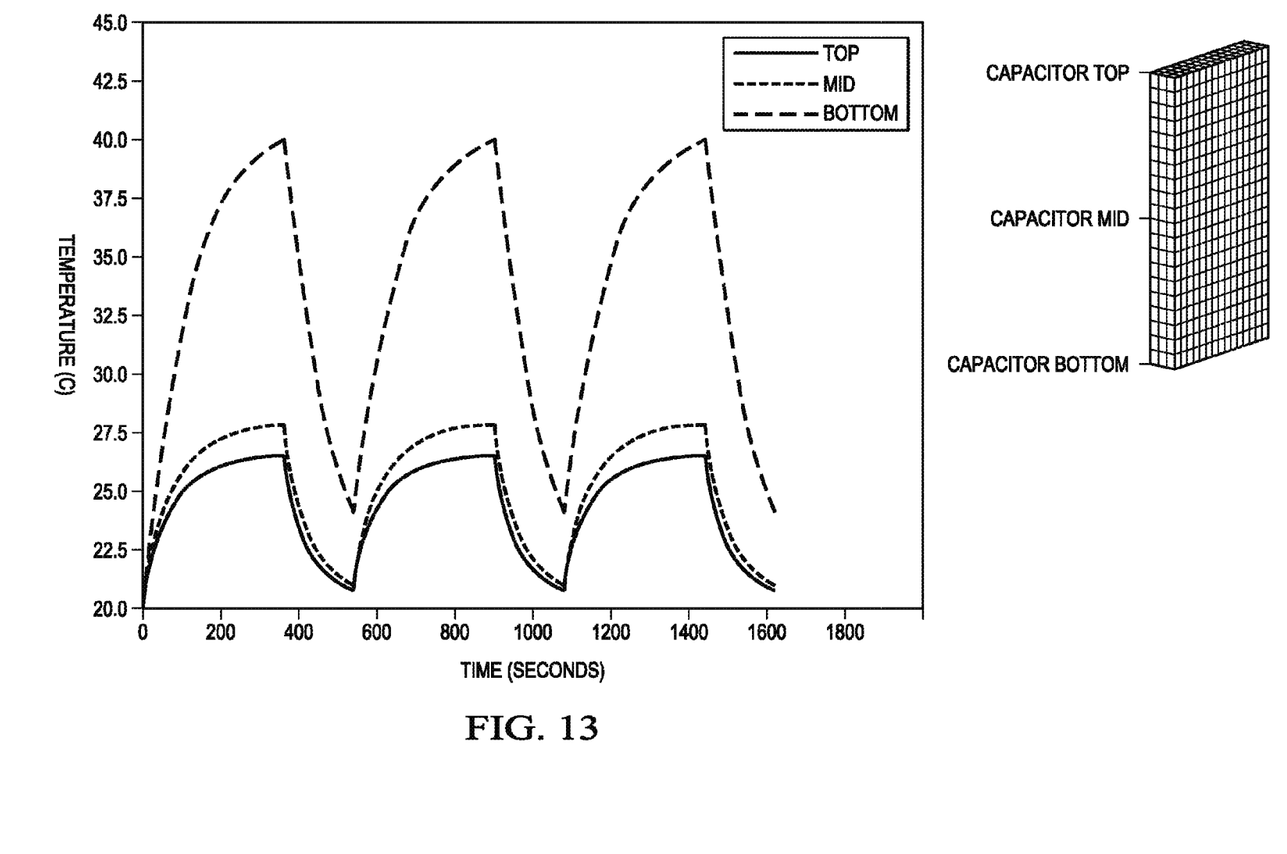
FIG. 13 illustrates the temperature profile at various locations in the capacitor over time during pulsed energy delivery in one embodiment.

FIG. 13 illustrates a graph of temperature profile during continuous delivery of energy pulses, such as 20 pulses per minute pulse cycle (every 3 seconds), with a 30 minute pause between pulse cycles, with a maximum capacitor temperature of about 40 degrees Celsius. According to this disclosure, a continuous delivery of energy pulses is possible, without any rest time between energy pulse cycles, as the capacitor 10 cooling system maintains the temperature of the capacitors approximately 15 degrees Celsius below a maximum operating temperature, such as 55 degrees Celsius for certain polypropylene capacitor dielectrics. This profile provides a long capacitor life, enabling a higher voltage capacitor per module, and a higher energy density capacitor. This also allows a greater flexibility in polypropylene choices for the capacitors 14, and providing a substantially increased MJ/cubic meter. Further, this prevents degradation in capacitor performance during all stages of operation.

This disclosure advantageously provides a greater capacitance and improved operating time stability. The thermal scheme enables performance independent of the capacitor orientation with respect to gravity. The low profile heat exchanger has an integrated plenum-fed distributor. The heat exchanger, spacer plate and spacer strips enable uniform fluid flow of the native cooling fluid to the entire capacitor bank. The heat exchanger heat transfer area is scalable as required.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A high density capacitor, comprising:
a housing having a cavity;
a plurality of capacitors forming at least one capacitor bank disposed in the cavity, each of the capacitors having an outer surface, the at least one capacitor bank having spacings between the outer surfaces of the capacitors;
a native cooling fluid disposed in the cavity and contacting the capacitors;
a heat exchanger coupled to the housing; and
a pump hydraulically coupled to the heat exchanger and configured to circulate the native cooling fluid from the cavity, through the heat exchanger, through the spacings, and along and in contact with the outer surface of each of the capacitors to cool the capacitors using forced convection;
wherein the heat exchanger is configured to communicate a secondary fluid through the heat exchanger and draw heat from the native cooling fluid flowing through the heat exchanger.

2. The high density capacitor as specified in claim 1, wherein the heat exchanger has a plenum having a plurality of openings configured to dispense the native cooling fluid from the heat exchanger proximate the at least one capacitor bank.

3. The high density capacitor as specified in claim 2, wherein the heat exchanger has a first passageway configured to communicate the native cooling fluid from the pump to the openings of the plenum, a second passageway configured to communicate the secondary fluid, and a thermally conductive member separating the first passageway from the second passageway.

4. The high density capacitor as specified in claim 3, wherein the first passageway and the second passageway are separated from each other by a planar member.

5. The high density capacitor as specified in claim 4, wherein the first passageway is planar and the second passageway is planar.

6. A high density capacitor, comprising:
a housing having a cavity;
a plurality of capacitors forming at least one capacitor bank disposed in the cavity, each of the capacitors having an outer surface, the at least one capacitor bank having spacings between the outer surfaces of the capacitors;
a heat exchanger coupled to the housing; and
a pump hydraulically coupled to the heat exchanger and configured to circulate a native cooling fluid disposed in the cavity from the cavity, through the heat exchanger, through the spacings, and along the outer surface of each of the capacitors to cool the capacitors using forced convection;
wherein the heat exchanger is configured to communicate a secondary fluid through the heat exchanger and draw heat from the native cooling fluid flowing through the heat exchanger;
wherein the heat exchanger has a plenum having a plurality of openings configured to dispense the native cooling fluid from the heat exchanger proximate the at least one capacitor bank;
wherein the heat exchanger has a first passageway configured to communicate the native cooling fluid from the pump to the openings of the plenum, a second passageway configured to communicate the secondary fluid, and a thermally conductive member separating the first passageway from the second passageway;

wherein the first passageway and the second passageway are separated from each other by a planar member, the first passageway is planar, and the second passageway is planar;

wherein the first passageway is formed by a first plate;

wherein the second passageway is formed by a second plate; and wherein each plate has a plurality of fins configured to create an even planar flow of fluid through the respective passageway.

7. The high density capacitor as specified in claim 6, wherein the first passageway is partially covered by a plate on top of the first passageway, thereby forming the plenum configured to discharge the native cooling fluid from the first passageway.

8. The high density capacitor as specified in claim 7, wherein the plates are brazed to each other to create a brazement.

9. A high density capacitor, comprising:
   a housing having a cavity;
   a plurality of capacitors forming at least one capacitor bank disposed in the cavity, each of the capacitors having an outer surface, the at least one capacitor bank having spacings between the outer surfaces of the capacitors;
   a heat exchanger coupled to the housing; and
   a pump hydraulically coupled to the heat exchanger and configured to circulate a native cooling fluid disposed in the cavity from the cavity, through the heat exchanger, through the spacings, and along the outer surface of each of the capacitors to cool the capacitors using forced convection;
   wherein the heat exchanger has a plenum having a plurality of openings configured to dispense the native cooling fluid from the heat exchanger proximate the at least one capacitor bank; and
   wherein the openings of the plenum have opening sizes graduated from one side of the plenum to another side of the plenum.

10. The high density capacitor as specified in claim 9, wherein the openings of the plenum are configured to evenly dispense the native cooling fluid across the at least one capacitor bank.

11. The high density capacitor as specified in claim 1, wherein:
   the at least one capacitor bank comprises a first bank of capacitors and a second bank of capacitors disposed upon the first bank of capacitors; and
   a spacer is disposed between the first bank of capacitors and the second bank of capacitors.

12. The high density capacitor as specified in claim 11, wherein the spacer is configured to direct a portion of the native cooling fluid from the heat exchanger laterally between the first bank of capacitors and the second bank of capacitors.

13. The high density capacitor as specified in claim 11, wherein the spacer is configured to direct a portion of the native cooling fluid from the heat exchanger in a columnar fashion to the first bank of capacitors and the second bank of capacitors.

14. The high density capacitor as specified in claim 11, wherein the spacer has an interface configured to engage a top portion of the first bank of capacitors and a lower portion of the second bank of capacitors.

15. The high density capacitor as specified in claim 14, wherein the interface is configured to secure the first bank of capacitors with respect to the second bank of capacitors and dampen any vibration of the first and second banks of capacitors.

16. A high density capacitor, comprising:
   a housing having a cavity;
   a plurality of capacitors forming at least one capacitor bank disposed in the cavity, each of the capacitors having an outer surface, the at least one capacitor bank having spacings between the outer surfaces of the capacitors;
   a heat exchanger coupled to the housing; and
   a pump hydraulically coupled to the heat exchanger and configured to circulate a native cooling fluid disposed in the cavity from the cavity, through the heat exchanger, through the spacings, and along the outer surface of each of the capacitors to cool the capacitors using forced convection;
   wherein the heat exchanger has a plenum having a plurality of openings configured to dispense the native cooling fluid from the heat exchanger proximate the at least one capacitor bank;
   wherein the at least one capacitor bank comprises a first bank of capacitors and a second bank of capacitors; and
   wherein the high density capacitor further comprises:
      a spacer having at least one opening configured to pass a first portion of the native cooling fluid from the openings of the plenum; and
      a director configured to route a second portion of the native cooling fluid from the openings of the plenum laterally between the first bank of capacitors and the second bank of capacitors.

17. The high density capacitor as specified in claim 16, wherein the spacer is configured to pass the first portion of the native cooling fluid in a columnar fashion to the first and second banks of capacitors.

18. The high density capacitor as specified in claim 1, further comprising:
   spacers disposed between the capacitors and creating the spacings between the capacitors.

19. The high density capacitor as specified in claim 18, wherein the spacers are configured to provide columnar fluid routing of the native cooling fluid through the spacers and across major surfaces of the capacitors extending normal with respect to the heat exchanger.

20. A high density capacitor, comprising:
   a housing having a cavity;
   a plurality of capacitors fowlAAling at least one capacitor bank disposed in the cavity, each of the capacitors having an outer surface, the at least one capacitor bank having spacings between the outer surfaces of the capacitors;
   a heat exchanger coupled to the housing;
   a pump hydraulically coupled to the heat exchanger and configured to circulate a native cooling fluid disposed in the cavity from the cavity, through the heat exchanger, through the spacings, and along the outer surface of each of the capacitors to cool the capacitors using forced convection; and
   spacers disposed between the capacitors and creating the spacings between the capacitors, wherein the spacers are configured to provide columnar fluid routing of the native cooling fluid through the spacers and across major surfaces of the capacitors extending normal with respect to the heat exchanger;
   wherein the spacers are configured to provide spring-like pressure to the capacitors to maintain a preload between the capacitors.

21. The high density capacitor as specified in claim 1, wherein:
the capacitors are elongated and have major surfaces extending normal with respect to the heat exchanger; and
the at least one capacitor bank is configured such that a portion of the native cooling fluid is able to flow in a column in the spacings between the major surfaces of the capacitors.

22. The high density capacitor as specified in claim 1, wherein the pump is coupled to the housing.

23. A high density capacitor, comprising:
a housing having a cavity;
a plurality of capacitors forming a capacitor bank disposed in the cavity, each of the capacitors having an outer surface, the capacitor bank having spacings between the outer surfaces of the capacitors;
a native cooling fluid disposed in the cavity and contacting the capacitors;
a heat exchanger coupled to the housing and having a first passageway configured to communicate the native cooling fluid, a second passageway configured to communicate a secondary fluid, and a thermally conductive member separating the first passageway from the second passageway; and
a pump configured to circulate the native cooling fluid from the cavity, through the first passageway of the heat exchanger, through the spacings, and along and in contact with the outer surface of each of the capacitors to cool the capacitors using forced convection;
wherein the second passageway is configured such that the secondary fluid flowing through the second passageway is configured to draw heat from the native cooling fluid flowing through the first passageway.

24. The high density capacitor as specified in claim 23, wherein the heat exchanger has a plenum having a plurality of openings configured to dispense the native cooling fluid from the first passageway of the heat exchanger proximate the capacitor bank.

25. A high density capacitor comprising:
a housing having a cavity;
a plurality of capacitors disposed in the cavity with spacings between outer surfaces of the capacitors;
a native cooling fluid disposed in the cavity and contacting the capacitors;
a heat exchanger coupled to the housing and having a first passageway configured to communicate the native cooling fluid, a second passageway configured to communicate a secondary fluid, and a thermally conductive member separating the first passageway from the second passageway, the heat exchanger configured to transfer heat from the native cooling fluid to the secondary fluid;
an inlet and an outlet configured to respectively provide the secondary fluid to and receive the secondary fluid from the second passageway of the heat exchanger; and
a pump coupled to the housing and configured to create a flow of the native cooling fluid, the pump configured to pull the native cooling fluid from the cavity and force the native cooling fluid into the first passageway of the heat exchanger;
wherein the heat exchanger has a plenum having a plurality of openings configured to dispense the native cooling fluid from the heat exchanger into the cavity.

26. The high density capacitor of claim 25, wherein the native cooling fluid comprises a dielectric.

27. The high density capacitor as specified in claim 20, wherein the heat exchanger is configured to communicate a secondary fluid through the heat exchanger and draw heat from the native cooling fluid flowing through the heat exchanger.

* * * * *